United States Patent
Geddes

(10) Patent No.: US 7,475,089 B1
(45) Date of Patent: Jan. 6, 2009

(54) ENHANCED PORTAL SERVER SYSTEM AND METHOD

(75) Inventor: Martin Geddes, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 439 days.

(21) Appl. No.: 10/932,789

(22) Filed: Sep. 2, 2004

(51) Int. Cl.
*G06F 17/30* (2006.01)

(52) U.S. Cl. .............................. 707/102; 707/3; 707/10

(58) Field of Classification Search ................. 707/10, 707/100, 3, 4, 102; 709/203; 715/200, 234, 715/760
See application file for complete search history.

(56) References Cited

U.S. PATENT DOCUMENTS

| | | | |
|---|---|---|---|
| 5,805,815 A | 9/1998 | Hill | 395/200.48 |
| 6,011,537 A | 1/2000 | Slotznick | 345/115 |
| 6,185,586 B1 | 2/2001 | Judson | 707/513 |
| 6,268,856 B1 | 7/2001 | Bruck et al. | 345/357 |
| 6,457,025 B2 | 9/2002 | Judson | 707/501.1 |
| 6,466,967 B2 | 10/2002 | Landsman et al. | 709/203 |
| 7,117,436 B1* | 10/2006 | O'Rourke et al. | 715/205 |
| 2004/0090969 A1* | 5/2004 | Jerrard-Dunne et al. | 370/395.54 |
| 2005/0192771 A1* | 9/2005 | Fischer et al. | 702/122 |
| 2005/0198195 A1* | 9/2005 | Bowser et al. | 709/217 |
| 2006/0059125 A1* | 3/2006 | Yan | 707/3 |

OTHER PUBLICATIONS http://arp.anu.edu.au/~kahlil/pdk/articles/adding.customization.html. Printed Oct. 24, 2002.
http://arp.anu.edu.au/~kahlil/pdk/articles/add.portlets.to.provider.xml.html. Printed Oct. 24, 2002.
http://arp.anu.edu.au/~kahlil/pdk/jpdk/providers/sample/xml_tag_reference.txt. Printed on Oct. 24, 2002.
http://www-3.ibm.com/software/webservers/portal/library/Info_Center/wps/wpspage1.html. Printed on Oct. 24, 2002.

* cited by examiner

*Primary Examiner*—Cheryl Lewis

(57) ABSTRACT

A portal server keeps a record of the availability of portlets. When a client node sends a request for a portal page, the portal server checks the record to determine whether portlets in the portal page are available. If a portlet is unavailable, the portal server sends a portal page with a substitute portlet without requiring the client node to wait for unavailable portlets. The substitute portlet may notify the user that the requested portlet is delayed, and/or it may provide the user with an option to attempt to reload the portlet or to be notified—for example by email—when the portlet is available.

22 Claims, 3 Drawing Sheets

ENHANCED PORTAL SERVER SYSTEM AND METHOD

BACKGROUND

Users of the World Wide Web and other network resources often access networked information through a portal server. A portal server compiles information from different sources and sends the information in a "portal page" to the user. Information collected from each source and included in the portal page is called a "portlet."

In the prior art, when a user requests a portal page, the portal server attempts to retrieve each of the portlets before sending the portal page to the user. If one of these portlets takes an excessive amount of time to retrieve, the entire portal page may be delayed. The user may become frustrated during the delay and may even decide against waiting for the portal page. Eventually, the portal server may send a message to the user indicating that the portlet is unavailable. However, by this time, the user has already been required to wait through an attempt to load the portlet, and he or she may choose not to visit the portal page again.

SUMMARY

A portal server keeps a record of the availability of portlets. When a client node sends a request for a portal page, the portal server checks the record to determine whether portlets in the portal page are available. If a portlet is unavailable, the portal server sends a portal page with a substitute portlet, without requiring the client node to wait for unavailable portlets.

The substitute portlet may notify the user that the requested portlet is delayed, and/or it may provide the user with an option to reload the portal or to be notified when the portlet is available. The substitute portlet may notify the user of length of the expected delay.

The availability of a resource may be determined by measuring the elapsed time between when a portlet is requested and when the portlet is received. Where multiple measurements are made, the expected delay can be a running average of those measurements, with more recent measured delays weighing more heavily in the average. The expected delay for a portlet resource may be determined in part by the measured and/or expected delays of similar portlet resources, such as portlet resources provided by the same Web server.

DETAILED DESCRIPTION

1. Overview of the Portal Server

Figure 1:
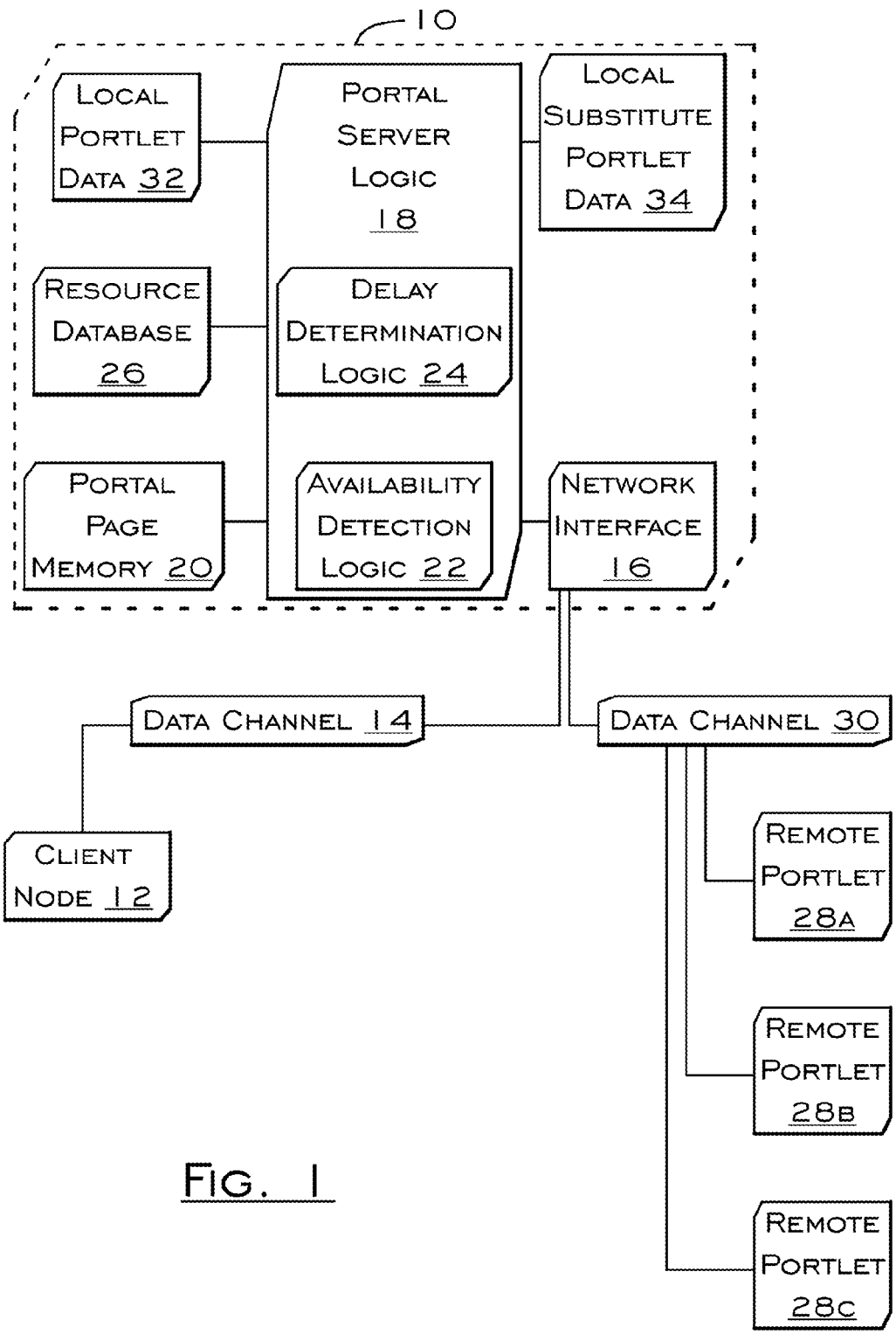
FIG. 1 is a schematic block diagram illustrating a portal server implemented in a network.

A portal server operates to send portal pages over a network, such as the Internet, to various client nodes. FIG. 1 illustrates a portal server 10 implemented in a network. When a client node 12 wishes to receive a portal page, it sends a portal page request over a data channel 14 to the portal server 10. In one example, the client node 12 is an individual user's interface to the Internet, and the data channel 14 is the Internet. The individual can type a URL of the portal page into a Web browser, or click on a link to the portal page, to initiate a portal page request. The individual's Web browser may then send a portal page request to the portal server 10 in the form of a Hypertext Transfer Protocol (HTTP) request message.

After a user requests a portal page, the portal server 10 constructs the portal page and sends the portal page to the user. The portal server 10 has an interface 16 to the data channel 14 through which it receives requests for portal pages. The portal server 10 has portal server logic 18 to construct the requested portal pages.

The portal server logic 18 constructs portal pages according to portal page instructions stored in a portal page memory 20. These instructions provide a description of the contents of the requested portal page. For example, where the requested portal page includes one or more portlet resources, the page instructions include references to the portlets. The portlet references may include, for example, a URL of the portlet. The various formats possible for page instructions are described in further detail in Section 2, below.

A portal server may offer many different portal pages. In one embodiment, the portal server may offer personalized portal pages for different users. For example, a portal server may offer a news page that allows different users to select the types of stories that interest them the most and that highlights those stories to the users. In another embodiment, the portal server may offer portal pages for different services, such as one portal page that displays product inventory and another portal page that displays accounts receivable. To offer different portal pages, the portal server may have a collection of different portal page instructions in the portal page memory 20. When the portal server receives a request for a portal page, the portal server logic 18 selects the page instructions that correspond to the page request.

After selecting the page instructions, the portal server logic 18 identifies portlet references that appear in these instructions. The portlet references specify which portlet resources are to be included in the requested portal page. The portlet references may refer to portlets that are stored locally at the portal server in a local portlet data memory 32, or they may refer to remote portlet data stored at other servers 28a, 28b, 28c.

Once a portlet reference is identified, the portal server determines whether or not the referenced portlet is available. If the referenced portlet is available, the portal server includes the referenced portlet in the portal page. Otherwise, if the referenced portlet is not available, the portal server includes a substitute portlet in the portal page. Thus, depending on the availability of the portlet, a referenced portlet may not ultimately appear in the constructed portal page that is sent to the client node.

The portal server determines the availability of portlets by monitoring records of previous attempts to retrieve the portlets. To determine whether a referenced portlet is available, the portal server checks a record that reflects the outcome of one or more prior attempts to retrieve the portlet. If attempts to retrieve the portlet have been unsuccessful, or if such attempts have taken an excessive amount of time, the record reflects that the resource is unavailable. Thus, if previous attempts to retrieve a portlet have been slow or have failed, the portal server need not require the client node to wait while the portal server makes another attempt to retrieve an unavailable portlet.

In one embodiment, availability is tracked only for specified portlets. For example, if local portlets are less likely to be unavailable than remote portlets, the portal server need not check the availability of local portlets.

Records on the availability of portlets are, in one embodiment, stored in a resource database 26. In this embodiment, the portal server is provided with availability detection logic 22 that accesses the resource database 26 to determine whether each referenced portlet is available. Records in the resource database 26 are created and updated by delay determination logic 24, which measures the delay and/or availability of portlets. The operation of the delay determination logic 24, the availability detection logic 22, and the resource database 26 are discussed in further detail in Section 3, below.

If the availability detection logic determines that a referenced portlet is available, the portal server retrieves the portlet and includes that portlet in the constructed portal page. If, however, the portlet is not available, the portal server includes a substitute portlet. A substitute portlet may be a simple message that the referenced portlet is unavailable, it may provide an option for the user to request another attempt to load the portlet, or it may be a portlet with content similar to that of the referenced portlet. The substitute portlet may be stored at the portal server as local substitute portlet data 34, or the substitute portlet may be stored at a remote location 28a, 28b, 28c. The variety in content and source of substitute portlets is described in further detail in Section 4, below.

After the portal page is constructed, the portal server sends the constructed portal page, including referenced and/or substitute portlets, to the client node 12 over the data channel 14.

2. Portal Page Instructions

In one embodiment, the portal server logic 18 refers to page instructions to determine how to construct a portal page in response to a request from a client node. Such instructions are stored in the portal page memory 20. These instructions direct the portal server to load portlets that are needed for a portal page, and they instruct the portal server how to assemble the portlets into the constructed page that is sent to the client node. The portal page memory may include one or more templates, which operate like blank forms that are filled in by the portal server with portlet data. For example, a template may take the form of HTML data that includes one or more non-HTML portlet tags. The portal server reads the portlet tags, loads portlet data associated with the tags, and inserts the portlet data into the HTML data.

Example 1 below is an example of template data of a type that may be stored in the portal page memory 20.

EXAMPLE 1

001: <HTML>

002: <HEAD>

003: <TITLE>[tag: PageTitle]</TITLE>

004: </HEAD>

005: <BODY>

006: <FONT SIZE=+0 FACE=p37 [tag:TypeFace]">

007: <P>The following update is provided by

008: <A href="[tag:ProvideruRL]">

009: [tag: ProviderName]<IA>:

010: <P>[tag:ProviderPortlet]</P>

011: </BODY>

012: </HTML>

In this example, the tag syntax—[tag: argument]—indicates to the portal server logic that the tag should be replaced with other data before the constructed portal page is sent to the client node. Some of this data may be generated by the portal server logic, while other data may be portlet data. As an example of data generated by the portal server logic, the logic may determine which typeface should be used in the portal page and insert the name of that typeface (such as "ARIAL") in place of "[tag: TypeFace]" in the portal page.

The tag "[tag:ProviderPortlet]" instructs the portal server logic to load the referenced portlet "ProviderPortlet" and to incorporate that portlet into the portal page. If the portal server loads the referenced portlet—"ProviderPortlet"—the portal server logic incorporates that portlet into the constructed portal page at the location of the tag. The use of tags in a template file is implemented by, for example, the Sun ONE Portal Server.

If the referenced portlet is unavailable and the portal server loads a substitute portlet, the portal server logic incorporates the substitute portlet in place of the referenced portlet at the location of the tag to create the constructed portal page.

3. Determining Portlet Availability

The portal server determines the availability of portlets by monitoring the results of previous attempts to load the portlet. In one embodiment, the portal server 18 determines whether a portlet resource is available by determining an expected delay time for the loading of the resource. The portal server compares the expected delay time to a threshold delay time. If the expected delay time exceeds the threshold delay time, then the resource is considered unavailable.

The portal server may employ the delay determination logic 24, the resource database 26, and the availability detection logic 22 to determine the availability of a portlet. The delay determination logic 24 determines the expected delay time for the loading of the portlet and stores the expected delay time in the resource database 26. Then, when a portal page referencing the portlet is requested, the availability detection logic 22 checks the resource database 26 to determine the expected delay time of the referenced portlet, and it compares the expected delay time with a threshold delay time. If the expected delay time exceeds the threshold delay time, the availability detection logic determines that the referenced portlet is unavailable, and the portal server sends a substitute portlet in the constructed portal page.

In another embodiment, it is the delay determination logic that compares the expected delay time with the threshold delay time and sets a flag in the resource database. The flag indicates whether or not the resource is available. When a portal page requesting the portlet is requested, the availability detection logic reads the flag to determine whether the portlet is available.

The delay threshold may differ for different referenced portlet resources. For example, a portlet resource of large size can have a longer threshold time than a smaller resource, or a resource of greater importance can have a longer threshold time than a resource of lesser importance. The delay threshold for a portlet resource, or other information used to calculate the delay threshold, may be stored in the resource database 26. A portlet may have different delay thresholds for different portal pages and/or different user nodes.

The delay threshold is preferably selected to be long enough to permit most portlets to load, but no so long that a user requesting the portal page grows impatient waiting for the portlets to load. As an example, the threshold may be set at ten seconds.

In one embodiment, the delay determination logic operates as follows. The delay determination logic measures the time that elapses between when the portal server logic 18 makes a request for a portlet resource and when the portlet has been completely received by the portal server. The delay determination logic may measure this delay time each time the portlet is requested. Alternatively, it may measure the delay time only during a representative sample of attempts to load the portlet. The delay determination logic may initiate requests for the portlet to measure the delay time even when the portlet has not been requested as a part of a portal page. Such requests allow updated measurements of expected delay even for infrequently-requested portlets.

The delay determination logic uses the measured delay time to determine an expected delay time. The expected delay time may be, for example, a running average of measured delay times. For example, with each new measurement of the delay time, the expected delay time may be updated by generating a weighted average of the new delay time with the old expected delay time, in a formula such as the following:

$$\text{new expected delay} = [(\text{old expected delay}) + (\alpha)(\text{measured delay})]/(1+\alpha)$$

In this formula, the value of $\alpha$ can be increased or decreased to give a greater or lesser weight, respectively, to the most recently measured delays. The value of $\alpha$ may be selected as 0.25, for example. In an alternative embodiment, the expected delay may simply be taken as the most recently measured expected delay.

The delay determination logic may use measured delay times for one portlet to determine an expected delay for another portlet. For example, where multiple portlets are offered by the same content server, the delay determination logic may average measured delay times from all of those portlets. That average may then be used as an expected delay time for any portlet offered by that content server.

In one embodiment, the portal server determines the availability of portlets by determining whether previous attempts to load the portlet resulted in an error message. For example, if the portal server attempts to load an unavailable portlet using the HTTP protocol, it may receive an HTTP error message, such as the HTTP error code 503 "Server Error" message. The portal server may determine that a resource is unavailable if the most recent attempt to load the portlet has resulted in an error message. Alternatively, the portal server may calculate the percentage of attempts to load the portlet that result in an error message, and the server may determine that the portlet is unavailable if the percentage of errors exceeds a threshold percentage. In another embodiment, the portal server may treat an error message as a measured delay of a relatively long, preset duration. For example, if an error message is received even within a few seconds after requesting a portlet, the delay determination logic 24 of the portal server may treat the error message as a measured delay of 3 minutes and adjust the expected delay accordingly.

4. Substitute Portlets

In one embodiment of the portal server, when a portlet is unavailable, the portal server constructs a portal page that includes a substitute portlet in place of the unavailable portlet. For example, if the availability detection logic 22 determines that the referenced portlet resource is not available, then the portal server logic retrieves a substitute portlet to use in the constructed portal page. The substitute portlet may be retrieved from one of several possible sources. For example, the substitute portlet may be one of the remote portlets 28a, 28b, 28c, or it may be a locally stored substitute portlet 34.

The substitute portlet may include content similar to that of the referenced portlet. For example, where the referenced portlet includes weather information, the substitute portlet may also provide weather information. However, the substitute portlet does not necessarily have similar content to the referenced portlet. For example, a substitute portlet may simply provide an advertisement in place of an unavailable portlet.

Substitute portlets may be identified in the resource database 26. For example, an entry in the resource database corresponding to a referenced portlet may list one or more substitute portlets. Alternatively, one or more substitute portlets may be listed in the page instructions. For example, a tag in the page instructions (as described in Section 2, above), may include a list of portlets, such as the following tag:

[tag: ProviderPortlet; AlternativePortlet]

The portal server logic interprets the tag to identify "ProviderPortlet" as the requested portlet, and "AlternativePortlet" as the substitute portlet.

The portal server can test the availability of the substitute portlets before attempting retrieval, and more than one substitute portlet may be offered in case one substitute portlet is itself unavailable.

A substitute portlet may include a message indicating that the referenced portlet is unavailable. Such a substitute portlet may be implemented as local substitute portlet. The message may include a response request—a request for a response from the client node. For example, the substitute portlet may include a message that the requested resource is unavailable and further indicate that a user can click a button to reload the resource.

In one embodiment, when a portal server sends a substitute portlet with a response request to a client node, it makes a record of which portlet(s) were not available to that client node. That way, if the client node responds to the response request, the portal server can attempt again to send the unavailable portlets to that client node.

One type of response request informs the client node that the client node may attempt to load an unavailable portlet by sending a response. If the client node sends a response to such a response request, the portal server does not recheck for the availability of the portlet because the client node has already been informed of the potential delay and has chosen to load the portlet anyway.

When a referenced portlet is unavailable, the portal server may continue attempting to load the referenced portlet even after the constructed portal page (with the substitute portlet) is sent to the client node, so that, if the client node requests to reload the referenced portlet, the portal server may have retrieved the portlet previously considered unavailable.

The content of the substitute portlet can depend on the length of the expected delay of the referenced portlet. In that case, the availability detection logic may employ more than one threshold. For example, when the expected delay is above a first, relatively short threshold, the substitute portlet may inform the client node of a delay in retrieving the portlet and offer an opportunity to respond with a request to reload the portlet. When the expected delay is longer than a higher second threshold, the client node may simply be informed that the portlet cannot be loaded, with a message such as: "Resource unavailable. Please try again later." The substitute portlet may inform the client node of the amount of the expected delay, which may be rounded off, for example, to the nearest minute.

A substitute portlet that has a response request may include response logic to provide a mechanism through which the client node can respond to the message. The response logic may include, for example, an HTML form that instructs a browser to display a clickable button. The following example is one potential substitute portlet resource with response logic that may be provided to a client node.

EXAMPLE 2

001: <FORM METHOD=GET

002: ACTION="http://www.portalserver.com/portalpage.pl">

003: <p> Resource delayed. Estimated wait time is 3 min.

004: Click below to try again.</p>

005: <input type="hidden" name="userID" value="72894">

006: <input type="submit" value="Retry">

007: </FORM>

In this example, lines 001 and 007 delimit an HTML form, and lines 003-004 provide a message to the user indicating that the portlet is unavailable with the message text "Resource delayed. Estimated wait time is 3 min. Click below to try again." Line 006 creates a clickable button marked "Retry," allowing a user to make another attempt to load the portal page. When a user at the client node clicks on the button, the client node sends an HTTP GET request to the portal server requesting an updated version of the portal page. The URL used to request the updated portal page (specified in line 002) includes a "userID" value. In response to the GET request, the portal server can identify the client node with the "userID" value and provide to the identified client node a newly constructed portal page that includes the referenced portlet.

Response logic does not necessarily require an input from a user at the client node. A substitute portlet may request an automatic response from the client node. The following example illustrates a substitute portlet that requests an automatic response by directing a browser to reload the portal page after a delay period.

EXAMPLE 3

001: <p> Resource temporarily delayed.

002: Attempting to reload.</p>

003: <META http-equiv="refresh" content="5;url=

004: http://www.portalserver.com/

005: portalpage.pl?userID=72894">

Lines 001-002 display a message to the user indicating that the referenced portlet is unavailable, and lines 003-005 direct the user's browser to reload after five seconds. Such a substitute portlet may further include instructions, such as JavaScript instructions, to display a countdown timer showing the time remaining until the refresh operation. While the client node is waiting to refresh, the portal server may keep a connection open with the portal server with the goal that the portlet will become available by the time the refresh operation is performed.

Another type of response logic offers the user the opportunity to receive notification when a portlet becomes available. For example, the portal server may send an email notification to a user when the portlet becomes available. The response logic may include instructions for the creation of a form in which a user at the client node can enter an email address to which the availability notification can be sent. If, for example, the user's email address is known to the portal server (for example, if the user is a subscriber to the portal), then the form may simply request the user to click a button if he wishes to receive an email notification when the portal is available.

5. Exemplary Portal Page

After a client node makes a request for a portal page, the appearance of the constructed portal page sent to the client node may differ depending on whether each of the referenced portlets is available. To exemplify these differences, FIG. 3 illustrates a constructed portal page in which all referenced portlets are available, and FIG. 4 illustrates a constructed portal page in which one of the referenced portlets is unavailable and is replaced with a substitute portlet.

Figure 3:
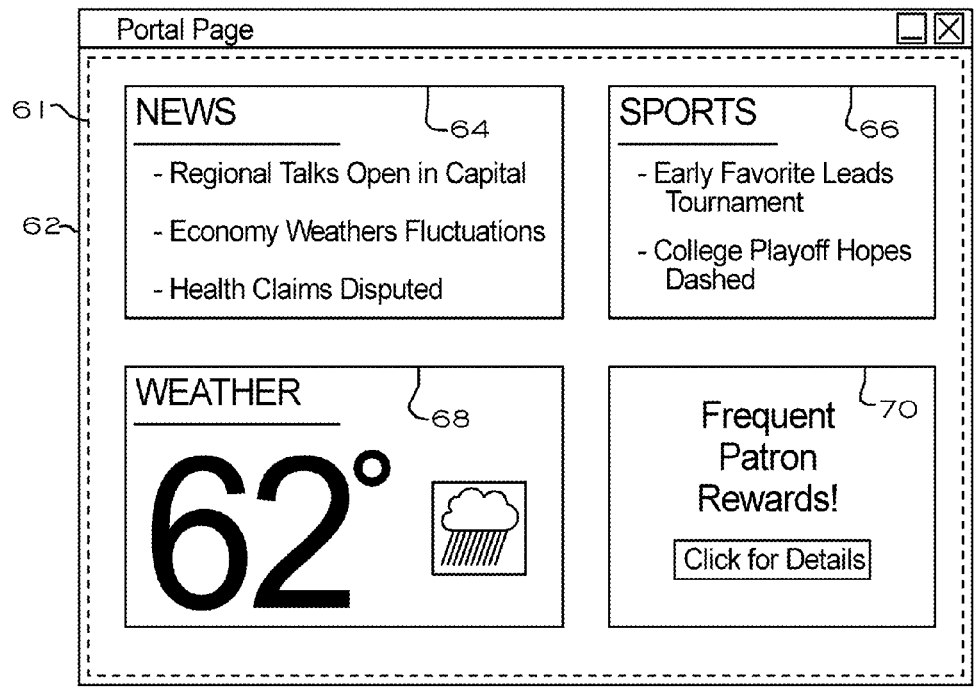
FIG. 3 illustrates the appearance of a constructed portal page at a client node.

FIG. 3 illustrates a constructed portal page 61 as it is displayed by a browser window 62 of the client node when all referenced portlets are available. The portal page 62 includes referenced portlets 64, 66, 68, and 70 that display news headlines (64), sports headlines (66), weather information (68), and advertising (70). Each of the referenced portlets may have been retrieved from a different content server remote from the portal server.

Figure 4:
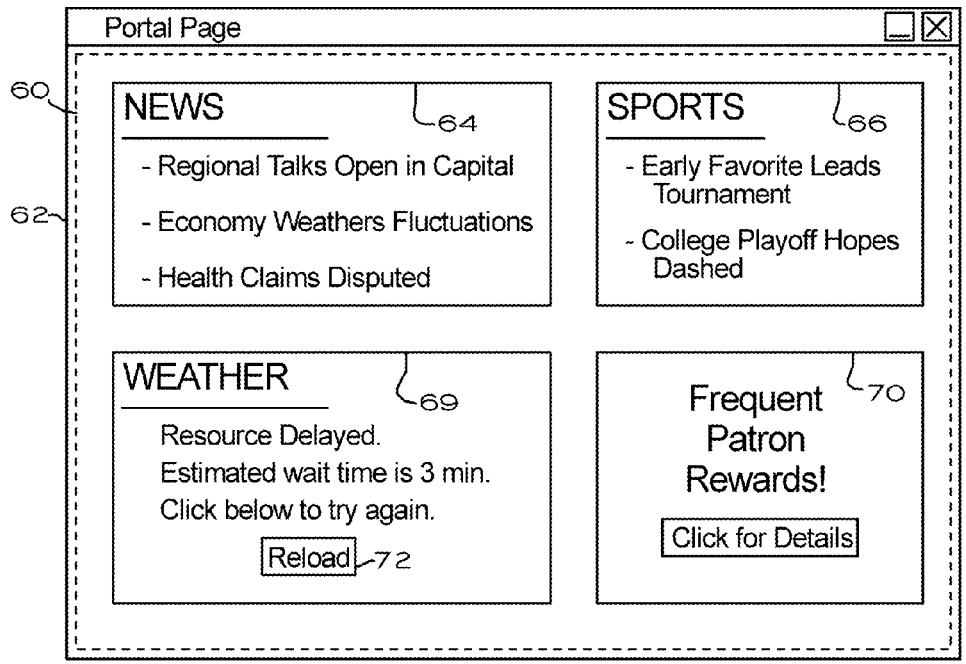
FIG. 4 illustrates the appearance of another constructed portal page at a client node.

FIG. 4 illustrates another constructed portal page 60 displayed in the browser window 62. Like the constructed portal page 61 of FIG. 3, the portal page 60 of FIG. 4 includes referenced portlets 64, 66, and 70 that display news headlines (64), sports headlines (66), and advertising (70). However, in place of the referenced portlet 68 (the weather information portlet), the constructed portal page 60 includes a substitute portlet 69. The substitute portlet 69 includes a message informing the user that the referenced portlet is delayed and that the wait time to load the resource is estimated to be three minutes. The substitute portlet 69 further includes a response request, advising the user to "Click below to try again." Response logic in the portlet creates a clickable button 72 labeled "Reload." When a user of the client node clicks the "Reload" button 72, the client node sends to the portal server a request to load the referenced weather portlet 68.

It should be noted that in some embodiments, a constructed portal page having a substitute portlet may have the same appearance as a constructed portal page with no substitute portlets. For example, instead of the substitute portlet 69, which informs the user of the delay, the substitute portlet may be another weather portlet providing the same information as the referenced weather portlet 68.

6. Portal Server Process

Figure 2:
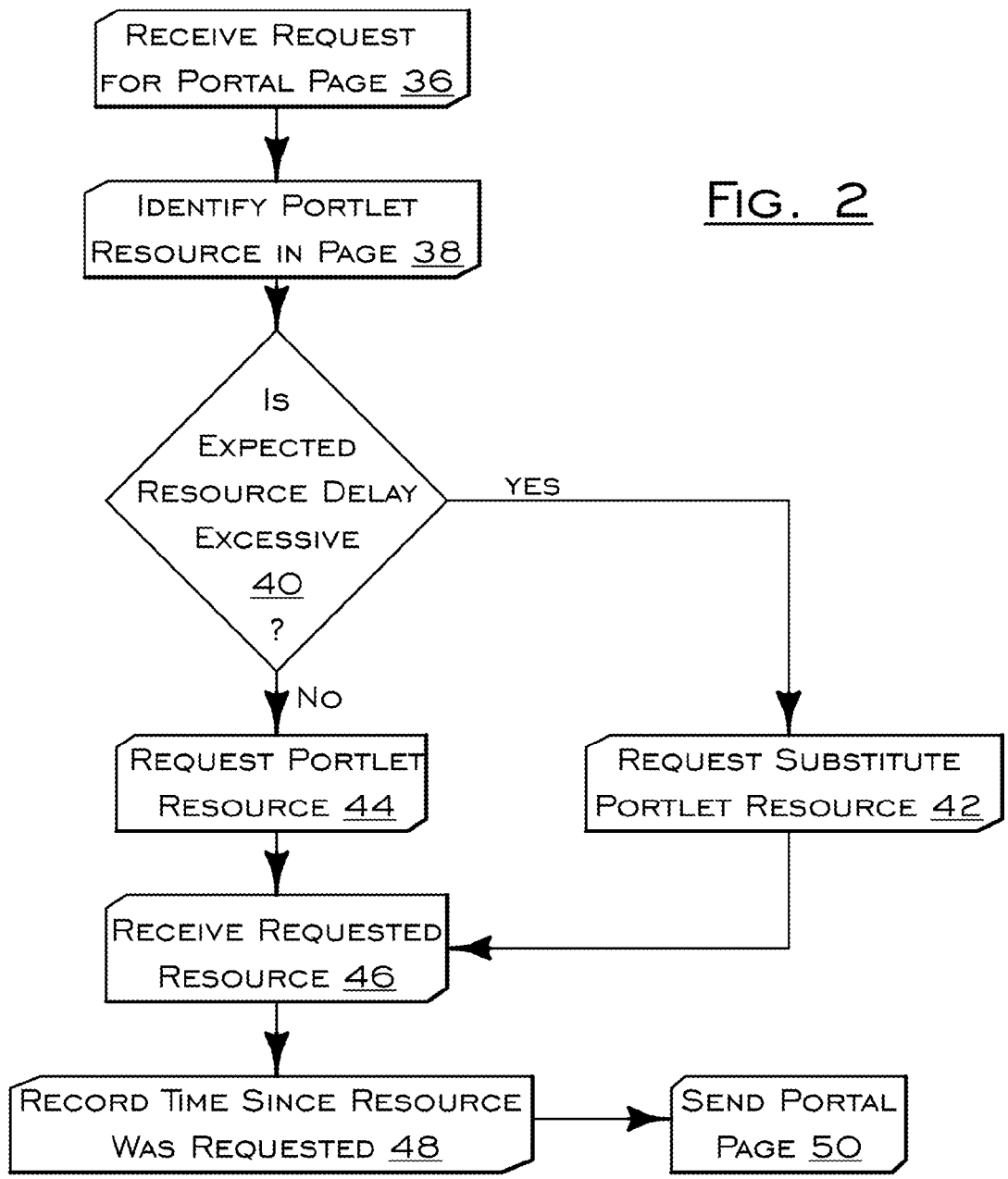
FIG. 2 is a flow diagram illustrating the operation of a portal server.

FIG. 2 is an exemplary flow diagram illustrating the operation of a portal server. The portal server receives a request for a portal page from a client node at step 36. The server refers to portal page instructions at step 38 to identify portlets referenced in the requested portal page. For each referenced portlet, the server determines at step 40 whether the referenced portlet is available. The server determines the availability of the referenced portlet, for example, by determining whether the expected delay in loading the portlet is excessive. If the expected delay is excessive, the server requests a substitute portlet at step 42. Otherwise, the server requests the referenced portlet at step 44.

The server receives the requested portlet (which may be the referenced portlet or the substitute portlet) at step 46 and records the time elapsed since the portlet was requested at step 48. The server uses this measured elapsed time to determine the expected delay of the portlet, for use in serving future portal page requests. At step 50, the constructed portal page is sent to the user node together with the portlets (whether referenced portlets or substitute portlets).

In a variation on the embodiment illustrated in FIG. 2, the portal server requests the referenced portlet resource regardless of whether that resource has been determined to be available. In this way, the portal server can measure new delay time for the referenced portlet, allowing the portal server to determine whether a previously unavailable portlet is now available. The request for a referenced portlet resource may be made even before the server attempts to determine whether the resource is available.

The portal server may periodically initiate requests for a portlet so that the expected delay for that resource can be determined even before a portal page that refers to the portlet is requested. In one embodiment, the portal server determines the expected load time of a resource based in part on load times measured when clients other than the client node 12 have requested the portal page before the request by the client node 12.

In an alternative embodiment, the method described in section 6 above may be performed by a content distribution server other than a portal server. One such content distribution server is a proxy server. In such an embodiment, the proxy server receives a request for a content page from a client node. The content page, which may be a Web page, references content that is stored remotely from the proxy server. The proxy server determines whether the expected delay time for retrieving the remote referenced content is greater than a threshold delay time. If the expected delay time exceeds the threshold delay time, the proxy server constructs a substitute content page. The substitute content page includes a substitute for the referenced remote content.

7. Additional Embodiments

The system described herein can be embodied with variations from the examples described above, and the details of those embodiments can be implemented with a variety of techniques.

For example, the portal server logic, delay determination logic, and availability detection logic may be implemented in software as instructions stored in a data storage medium and executable by a processor. The data storage medium may be a CD-ROM, DVD-ROM, hard drive, random-access memory, or other storage medium. The executable instructions may be, for example, machine language instructions, bytecode, or interpreted instructions. As an alternative to a software implementation, elements of the portal server may be implemented as hardwired electronic circuits such as digital logic circuits. The network interface may include digital hardware in combination with software drivers. The components of the portal server may communicate over a data channel, such as a data bus or a data network.

The portal server itself may be implemented in one of a variety of ways. For example, the portal server may be implemented on a single portal server computer, or by a cluster of portal server computers.

The data channels 14 and 30 may include Internet connections, intranet connections, link layer connections, wireless connections, and/or other forms of data communications. Where the data channel 30 includes an Internet connection, a request for a portlet may be an HTTP request message, but it could take other forms, as well.

The embodiments described above should be understood to illustrate rather than limit the scope of the present invention. Features of the various embodiments can be interchanged and combined while keeping within the scope of the invention, as defined by the following claims.

The invention claimed is:

1. A method executed on at least one computer for providing a portal service, comprising:
   receiving from a client node a request for a portal page, wherein the requested portal page references a portlet;
   checking a resource database to determine whether an expected delay time for retrieving the referenced portlet exceeds a threshold delay time; and
   creating a constructed portal page, wherein the constructed portal page includes a substitute portlet if the expected delay time exceeds the threshold delay time, and wherein the constructed portal page includes the referenced portlet if the expected delay time does not exceed the threshold delay time.

2. The method of claim 1, further comprising sending the constructed portal page to the client node.

3. The method of claim 1, wherein the substitute portlet includes a message identifying the expected delay time.

4. The method of claim 1, wherein creating the constructed portal page includes retrieving a substitute portlet if the expected delay time exceeds the threshold delay time.

5. The method of claim 1, further comprising:
   sending at least one request for the referenced portlet;
   measuring at least one measured delay time for receiving the referenced portlet and;
   storing the expected delay time in the resource database;
   wherein the expected delay time depends at least in part on the at least one measured delay time.

6. The method of claim 5, wherein the expected delay time is an average of more than one measured delay times.

7. The method of claim 1, wherein the substitute portlet includes response logic operative to send a response message from the client node to the portal server.

8. The method of claim 7, wherein the response message is a request to reload the portal page.

9. A method executed on at least one computer for providing a portal service, comprising:
   receiving from a client node a request for a portal page;
   identifying a referenced portlet associated with the portal page;
   in response to checking a resource database, determining that the referenced portlet is not available;
   in response to a determination that the referenced portlet is not available, creating a constructed portal page, wherein the constructed portal page includes a substitute portlet.

10. The method of claim 9, further comprising sending the constructed portal page to the user.

11. The method of claim 9, wherein the substitute portlet includes a message identifying the expected delay.

12. The method of claim 9, wherein the substitute portlet includes a request for a user response.

13. The method of claim 12, wherein the substitute portlet includes response logic operative to send a response message from the client node to the portal server.

14. The method of claim 13, wherein the response message is a request to reload the portal page.

15. The method of claim 12, wherein the response message is a request for a notification when the referenced portlet becomes available.

16. The method of claim 9, wherein determining whether the referenced portlet is available includes determining whether an expected delay of retrieving the portlet exceeds a delay threshold.

17. A portal server comprising:
  a network interface for receiving from a user a request for a portal page;
  delay determination logic operative to determine an expected delay time for retrieving a referenced portlet associated with the portal page and to record, in a resource database, either (a) the expected delay time or (b) information indicating whether the expected delay time exceeds a delay threshold; and
  portal server logic operative to check the resource database to determine whether the expected delay time exceeds the delay threshold, and to create a constructed portal page, wherein the constructed portal page includes the requested portlet if the expected delay time exceeds a delay threshold, and wherein the constructed portal page includes a substitute portlet if the expected delay time does not exceed the delay threshold.

18. The server of claim 17, further comprising delay determination logic operative to measure at least one measured delay time for retrieving the referenced portlet, and wherein the expected delay time is determined at least in part from the at least one measured delay time.

19. A portal server, comprising:
  a network interface;
  a processor; and
  data storage;
  wherein the data storage stores instructions executable by the processor (i) to receive a request for a portal page over the network interface; (ii) to identify a referenced portlet associated with the requested portal page; and (iii) to create a constructed portal page, wherein the constructed portal page includes the referenced portlet if the expected delay is less than a threshold delay, and wherein the constructed portal page includes a substitute portlet if the expected delay is greater than a threshold delay; and
  wherein the network interface is operative to send the constructed portal page in response to the request for the portal page.

20. A method executed on at least one computer for providing a portal service, comprising:
  receiving from a client node a request for a portal page;
  identifying a referenced portlet associated with the requested portal page;
  checking a resource database to determine whether the referenced portlet is available, wherein the determination is based at least in part on an expected delay time of the referenced portlet;
  creating a constructed portal page, wherein the constructed portal page includes a substitute portlet if the referenced portlet is not available; and
  sending the constructed portal page to the client node.

21. A method executed on at least one computer for providing a content page, comprising:
  receiving from a client node a request for a content page, wherein the requested content page references remote referenced content;
  checking a resource database to determine whether an expected delay time for retrieving the remote referenced content exceeds a threshold delay time;
  creating a constructed content page, wherein the constructed content page includes substitute referenced content if the expected delay time exceeds the threshold delay time; and
  sending the constructed portal page to the client node.

22. A method executed on at least one computer for serving content pages, comprising:
  receiving from a client node a request for a content page;
  identifying remote referenced content associated with the portal page;
  in response to checking a resource database, determining that the remote referenced content is not available;
  in response to a determination that the remote referenced content is not available, creating a substitute content page, wherein the substitute content page includes substitute referenced content.

* * * * *